United States Patent [19]

Yamada et al.

[11] Patent Number: 4,678,160

[45] Date of Patent: Jul. 7, 1987

[54] SOLENOID VALVE

[75] Inventors: Keiichi Yamada; Tatsuhiko Abe, both of Higashimatsuyama, Japan

[73] Assignee: Diesel Kiki Co., Ltd., Tokyo, Japan

[21] Appl. No.: 885,145

[22] Filed: Jul. 14, 1986

[30] Foreign Application Priority Data

Jul. 18, 1985 [JP] Japan ................................ 60-157049

[51] Int. Cl.[4] ............................................ F16K 31/06

[52] U.S. Cl. ............................ 251/129.02; 251/129.1; 251/129.16; 239/585; 137/554

[58] Field of Search ........... 251/129.09, 129.1, 129.02, 251/129.16, 129.18; 235/585; 137/554

[56] References Cited

U.S. PATENT DOCUMENTS 4,111,178 9/1978 Lasey ............................ 137/554 X
4,276,903 7/1981 Spohr ................................ 137/554
4,573,659 3/1986 Homes ........................... 251/129.02

FOREIGN PATENT DOCUMENTS 2826214 12/1979 Fed. Rep. of Germany ...... 137/554

*Primary Examiner*—Arnold Rosenthal
*Attorney, Agent, or Firm*—James C. Wray

[57] ABSTRACT

In a solenoid valve with ON/OFF switch arranged by a valve member and the associated valve seat defined in an electrically conductive body, the solenoid valve has a stopper connected to the valve member for setting the stroke of the valve member and is guided by an insulating guide member mounted on the body in such a way that the stopper comes in contact with only one of the end portions of the guide member when the solenoid actuator is in the de-energized state and this end portion is acting as an electrically insulating stopping member for the stopper.

8 Claims, 4 Drawing Figures

FIG.2A
FIG.2B
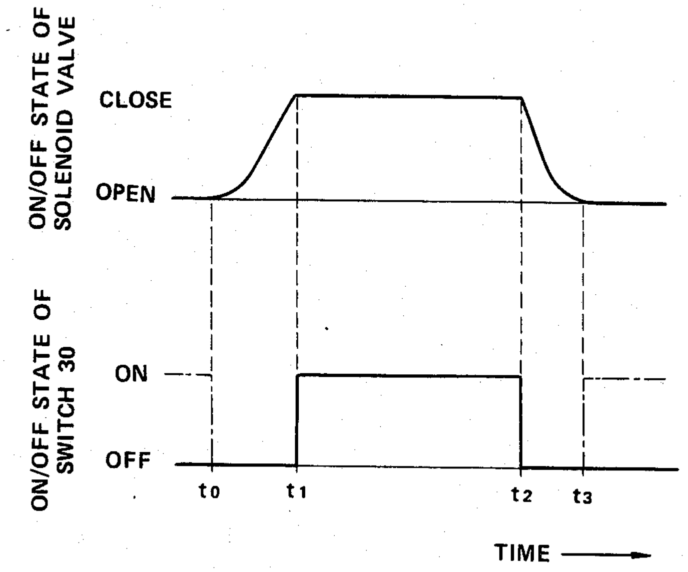
FIG.3
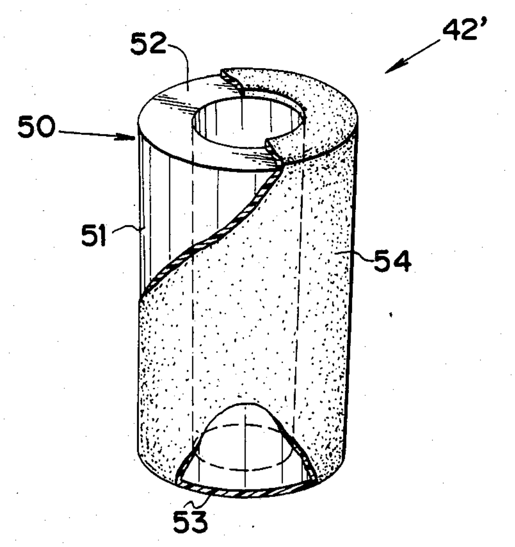

SOLENOID VALVE

BACKGROUND OF THE INVENTION

The present invention relates to a solenoid valve which is arranged so as to form a switch by a valve and the associated valve seat.

In the prior art, for obtaining an electric signal indicating the open/close state of a valve unit, it is well known to use a valve unit in which an ON-OFF switch is constituted by a valve and the associated valve seat. Such a solenoid valve unit having such a switch is needed, for example, for constituting a valve unit driving circuit in which the driving pulse applied to the valve unit is corrected in response to the timing of opening/closing of the valve unit in order to make the open/close timing of the valve unit coincide with a target timing. It is also needed for constituting a fuel injection valve which is capable of producing an electric signal indicating the injection timing of fuel.

As such a valve unit, there is disclosed for example in U.S. Pat. No. 4,111,178 (corresponding to DE-OS No. 2748447) a fuel injection valve in which a mechanical switch is constituted by a needle valve and a nozzle body in order to obtain an electric signal indicating the timing of the beginning of fuel injection and the timing of the end of fuel injection in response to the movement of the needle valve. In the disclosed fuel injection valve, a nozzle body and a needle valve smoothly moving in the guide hole of the nozzle body are formed of an electrically conductive material and the outer surface of the needle valve is covered with a ceramic insulation layer of a thickness between approximately 0.2 $\mu$m and 0.3 $\mu$m, or an insulation layer formed by the sputtering of aluminum oxide.

However, since the insulation layer of the conventional switch incorporated in the solenoid valve is formed only on the sliding surface of the valve member, it has the following disadvantages. Namely, although it is required for such a switch to maintain an open state during the open state of the valve, just after the opening of the valve or just before the closing of the valve, there is a possibility of the occurrence of an undesired electrical conducting state between the valve member and a member for determining the maximum stroke of the valve member for the opening state of the solenoid valve, whereby a noise signal is superposed on the desired signal derived from the switch. Consequently, in the case where the conventional switch is used, it is sometimes required to remove such an undesired signal by means of a complex signal processing circuit.

Furthermore, when the insulation layer or film is formed on the outer periphery of the valve member, the insulation layer is liable to peel off and the machining required for assuring a perfect fit between the valve member and the guide hole becomes difficult, so that the manufacturing cost is increased.

SUMMARY OF THE INVENTION

It is an object of the present invention to provide an improved solenoid valve having a switch constructed by a valve member and the associated valve seat.

It is another object of the present invention to provide a solenoid valve capable of constituting an ON-OFF switch which assumes the ON state only when the solenoid valve is in its closed state.

It is still another object of the present invention to provide a solenoid valve capable of constituting an ON-OFF switch without difficult machining and to assure the electrically insulating state between a valve member and a member for determining the maximum stroke of the valve member for the opening state of the solenoid valve.

According to the present invention, in a solenoid valve which has a valve member made of an electrically conductive material and an electrically conductive body having a valve seat associated with the valve member, thereby constituting a switch for electrically connecting the electrically conductive body with the valve member when the valve member is seated on the valve seat, the solenoid valve comprises a solenoid actuator which has a stator with an exciting coil and an armature fixed to the valve member and provides an electromagnetic force to seat the valve member on the valve seat, a spring means for biasing the valve member to separate from the valve seat at the time the solenoid actuator is in the de-energized state, a stopper connected to said valve member for determining the maximum stroke of the valve member for the opening state of the solenoid valve, and an insulating guide member having a guide hole for supporting and guiding the valve member while maintaining an electrically insulating state between said body and a sliding surface of the valve member. The insulating guide member is mounted on the body in such a way that the stopper comes in contact with only one of the end portions of the guide member when the solenoid actuator is in the de-energized state and this end portion is acting as an electrically insulating stopper member for the stopper.

The valve member is able to slidably move in the guide hole defined in the insulating guide member secured in the body and the electrically insulating condition between the body and the sliding surface of the valve member is assured. When the valve member moves in the guide hole in a predetermined direction and the solenoid valve is opened, the valve member moves until the stopper provided on the valve member comes in contact with the above-mentioned end portion of the insulating guide member and the position of the valve member at the open state of the solenoid valve depends upon the position of this end portion. Therefore, the electrically insulating state between the valve member and the body is established even when the stopper is in contact with the guide member during the open state of the solenoid valve, whereby it is possible to realize a switch which is closed only when the solenoid valve is closed.

According to the present invention, since a desired electrically insulating condition can be maintained between the valve member and the body by the use of an insulating guide member located therebetween, the insulating condition can be maintained with stability for long periods regardless of the movement of the valve member. Furthermore, the solenoid valve is constructed in such a way that a part of this insulating guide member acts as a stopping member associated with the stopper, so that it is possible with a simple construction to ensure the prevention of electrical contact between the valve member and the body at the time when the solenoid valve is open.

The invention will be better understood and other objects and advantages thereof will be more apparent from the following detailed description of preferred embodiments with reference to the accompanying drawings.

BRIEF DESCRIPTION OF THE DRAWINGS

FIG. 2A is a graph showing the ON-OFF state of the switch of the solenoid valve shown in FIG. 1;

FIG. 2B is a graph showing the waveform of a signal produced by the switch; and FIG. 3 is a perspective view, partly in cross section, of a modified insulating guide member.

DESCRIPTION OF THE PREFERRED EMBODIMENTS

Figure 1:
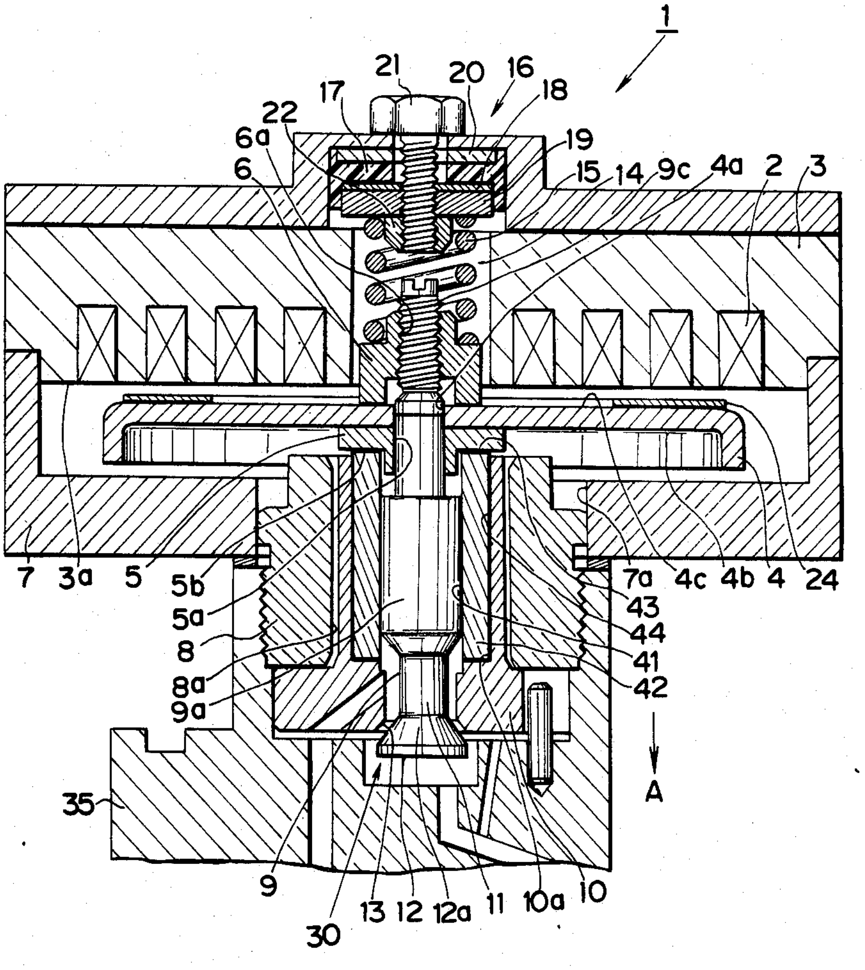
FIG. 1 is an elevation partly in section showing an embodiment of a fuel injection pump having a solenoid valve according to the present invention.

FIG. 1 is a partially sectional view showing an embodiment of a solenoid valve 1 having an ON-OFF switch according to the present invention. The solenoid valve 1 may be used for adjusting the quantity of fuel injection of a fuel injection pump. The solenoid valve 1 has a stator 3 with an exciting coil 2 and a disc-like armature 4 made of a magnetic material located so as to face the lower surface 3a of the stator 3.

The armature 4 has a through-hole 4a at its center and the outer periphery portion thereof is bent away from the stator 3. A stopper 5 is secured on the lower surface 4b of the armature 4 and a nut member 6 is secured on the upper surface 4c of the armature 4. The stopper 5 and the nut member 6 are arranged in such a way that a through-hole 5a of the stopper 5 and a tapped hole 6a of the nut member 6 are aligned with the through-hole 4a.

A supporting frame 7 is secured at the lower portion of the stator 3 and a cylindrical member 8 is secured in an opening 7a of the supporting frame 7. A body 10 is inserted into a hole 8a of the cylindrical member 8 and the body 10 is fixed in the cylindrical member 8 by a cap-like cover 35, which is screw-engaged with the outer tapped surface of the cylindrical member 8.

In a concave portion 10a of the body 10, there is provided an insulating guide member 42 which is a sleeve member having a guide hole 41 for slidably supporting and guiding a valve rod 9 and the insulating guide member 42 is secured to the body 10 by an appropriate strong adhesive, which is preferably an epoxy adhesive. In this embodiment, the insulating guide member 42 is made of a ceramic material which is an electrically insulating material and the outer surface of the insulating guide member 42 has grooves 44 so that the insulating guide member 42 is rigidly adhered to the body 10 by the adhesive.

So that the upper end surface 43 of the insulating guide member 42 can function as a stopper receiving member or a stopping member for the stopper 5, the height of the insulating guide member 42 is selected so as to be slightly higher than the upper end surfaces of the body 10 and the cylindrical member 8, which are made of an electrically conducting material.

The valve rod 9, which is supported and guided by the insulating guide member 42, has an enlarged diameter portion 9a whose diameter is slightly smaller than the inner diameter of the guide hole 41, whereby the guide hole 41 is able to guide the valve rod 9 slidably in its axial direction while maintaining an oil tight condition between the guide hole 41 and the enlarged diameter portion 9a of the valve rod 9. A valve head 12 is integrally formed at the lower end portion of the valve rod 9 and a valve face 12a of the valve head 12 is able to come in oil-tight contact with a valve seat 13 formed at the lower end opening of the body 10.

A screw portion 9c configured for screw-engagement with the tapped hole 6a of the nut member 6 is integrally formed on the upper portion of the valve rod 9. The valve rod 9 is inserted into the through-hole 5a of the stopper 5 and the screw portion 9c is screwed into the tapped hole 6a to secure the valve rod 9 to the armature 4.

The nut member 6 is positioned in a space 14 defined at the center portion of the stator 3. One end portion of a coil spring 15 received in the space 14 contacts the nut member 6 and the other end portion of the coil spring 15 contacts an electrode assembly 16 secured to the stator 3.

The electrode assembly 16 has a spring shoe 19 and an electrode 18 which is electrically insulated from the stator 3 by an insulating member 17, and an adjusting washer 20 for setting the force of the coil spring 15 is provided between the insulating member 17 and the stator 3. The adjusting washer 20, the insulating member 17, the electrode 18 and the spring shoe 19 are secured to the stator 3 by means of a bolt 21 and the associated nut 22.

As a result, the coil spring 15 operates between the electrode assembly 16 and the valve rod 9 so as to make the valve rod 9 move in the direction of arrow A, that is, to make the valve head 12 separate from the valve seat 13. Thus, when the exciting coil 2 is de-energized, the valve rod 9 moves in the direction of arrow A until a lower surface 5b of the stopper 5 comes in contact with the upper end surface 43 of the insulating guide member 42, and the valve rod 9 is maintained in the state where the lower surface 5b is in contact with the upper end surface 43 of the insulating guide member 42. Therefore, the width of the gap formed between the armature 4 and the stator 3 can be easily adjusted by screwing the nut member 6 up and down on the screw portion 9c of the valve rod 9.

In order to establish electrical contact between the valve rod 9 and the body 10 only when the valve head 12 of the valve rod 9 is seated on the valve seat 13, the guide member 42 is made of a ceramic material so that the electrically insulating state between the valve rod 9 and the body 10 is maintained even when the stopper 5 comes in contact with the guide member 42, whereby the OFF condition of a switch 30 formed by the valve rod 9 and the body 10 is assured during the time when the solenoid valve 1 is opened.

Furthermore, in this embodiment, an annular insulating sheet 24 is provided on the upper surface 4c of the armature 4 so that electrical contact between the armature 4 and the stator 3 can be effectively prevented even if the armature 4 should incline. More specifically, although the armature 4 is adjusted so as to maintain a gap of predetermined magnitude between the armature 4 and the stator 3 even when the armature 4 is attracted toward the stator 3 by the energization of the exciting coil 2, the gap is extremely small so that the peripheral portion of the armature 4 may come in contact with the stator 3 when the armature 4 inclines. However, the insulating sheet 24 maintains the electrical insulating condition between the armature 4 and the stator 3 even when the armature 4 inclines, so that it is assured that the switch constituted between the valve rod 9 and the valve seat 13 is turned ON even in such a case.

Since the armature 4, the spring shoe 19, the coil spring 15 and the nut member 6 are all made of an electrically conductive material, the valve rod 9 is always electrically connected through these members to the electrode 18, which is electrically connected with an exterior circuit through a wire (not shown).

The operation of the solenoid valve 1 shown in FIG. 1 will now be described with reference to FIGS. 2A and 2B.

Since the valve rod 9 descends under the force of the coil spring 15 when the exciting coil 2 is not excited, the valve head 12 is kept separated from the associated valve seat 13 so that the solenoid valve 1 is in its open state. As the large diameter portion 9a of the valve rod 9 is supported and guided by the insulating guide member 42 made of a ceramic which is an insulating material and the stopper 5 is in contact with the upper end surface 43 of the insulating guide member 42 in its open condition, the electrically insulating condition between the valve rod 9 and the body 10 is maintained even when the solenoid valve 1 is in its open state. Consequently, an electrically non-conductive state is established between the electrode 18 and the body 10. This condition corresponds to the state before $t=t_o$ shown in FIG. 2 and the switch 30 constituted by the valve rod 9 and the body 10 is in its OFF state.

When the exciting coil 2 is energized at $t=t_o$, the armature 4 is attracted to the stator 3 so that the valve rod 9 starts to move in the opposite direction to arrow A. Thus, the valve head 12 is seated on the associated valve seat 13 at $t=t_1$ to completely close the solenoid valve 1. At this time, the switch 30 assumes its closed state. At this time, although the armature 4 comes close to the stator 3, there is no danger of an electrically conducting state being established therebetween thanks to the presence of the insulating sheet 24.

When the exciting coil 2 is de-energized at $t=t_2$, the valve rod 9 starts to move in the direction shown by arrow A under the force of the coil spring 15. As a result, the electrically conducting state between the valve rod 9 and the body 10 is released immediately, so that the switch 30 assumes its OFF state. After this, the stopper 5 comes in contact with the upper surface 43 of the insulating guide member 42 at $t=t_3$ and the solenoid valve 1 is completely opened.

Because of the insulating guide member 42, the switch 30 of the solenoid valve 1 according to the present invention is, as shown in FIG. 2B, in its ON state only when the valve head 12 of the valve rod 9 is seated on the valve seat 13, while the conventional switch assumes the ON state even before $t=t_o$ and remains in this state even after $t=t_3$ as shown by the dot-dash line in FIG. 2B. Consequently, according to the switch 30 of the solenoid valve 1, it is easy to determine the time of the beginning of valve opening and the time of the beginning of valve closing on the basis of the signal from the switch, without the use of a complex signal processing circuit.

It should be noted that the insulating sheet 24 may be made of a polymide, a polyethyleneterephthalate or the like. Furthermore, the insulating sheet 24 may be provided on the lower surface 3a of the stator 3.

In the above-mentioned embodiment, a description was given of the case where the insulating guide member 42 is formed by the use of ceramic material. However, the material for the insulating guide member 42 is not limited to this and can be any insulation material with high durability such as a high performance plastic. Furthermore, as shown in FIG. 3, an insulating guide member 42' may be constituted by providing a polytetrafluoroethylene coating layer 54 on the outer surface 51, the upper end surface 52 and the lower end surface 53 of the cylindrical member 50 made of an appropriate electrical conducting material with high durability, such as steel.

We claim:

1. A solenoid valve which has a valve member made of an electrically conductive material and an electrically conductive body having a valve seat associated with said valve member, thereby constituting a switch for electrically connecting said electrically conductive body with said valve member when said valve member is seated on said valve seat, said solenoid valve comprising:

a solenoid actuator which has a stator with an exciting coil and an armature fixed to said valve member and provides an electromagnetic force to seat said valve member on said valve seat;

a spring means for biasing said valve member to separate from said valve seat at the time said solenoid actuator is in the de-energized state;

a stopper connected to said valve member for determining the maximum stroke of said valve member for the opening state of said solenoid valve; and an insulating guide member having a guide hole for supporting and guiding said valve member while maintaining an electrically insulating state between said body and a sliding surface of said valve member, said insulating guide member being mounted on the body in such a way that said stopper comes in contact with only one of the end portions of said insulating guide member when said solenoid actuator is in the de-energized state and this end portion is acting as an electrically insulating stopping member for said stopper.

2. A solenoid valve as claimed in claim 1 wherein said insulating guide member is made of ceramic.

3. A solenoid valve as claimed in claim 1 wherein said insulating guide member is made of high performance plastic.

4. A solenoid valve as claimed in claim 1 wherein said insulating guide member is made of an electrically conducting durable member having a guide hole and an insulating layer for coating on the surface of the durable member except for the inner surface of the guide hole, and the durable member is mounted on said body so as to maintain the electrically insulating state between the durable member and the body by the insulating layer.

5. A solenoid valve as claimed in claim 4 wherein said insulating layer is made of polytetrafluorethylene.

6. A solenoid valve as claimed in claim 1 wherein said valve member has an enlarged diameter portion and the enlarged diameter portion is supported and guided by the guide hole.

7. A solenoid valve as claimed in claim 1, further comprising an insulating member for preventing said armature from being electrically connecting with the stator, said insulating member being located between said armature and said stator.

8. A solenoid valve as claimed in claim 7 wherein said insulating member is an insulating sheet provided on the surface of said armature opposite to the stator.

* * * * *